United States Patent [19]
Riley

[11] Patent Number: 5,365,895
[45] Date of Patent: Nov. 22, 1994

[54] VARIABLE VALVE LIFT MECHANISM FOR INTERNAL COMBUSTION ENGINE

[75] Inventor: Michael B. Riley, Fort Collins, Colo.

[73] Assignee: Motive Holdings Limited, Tortola, Virgin Islands (Br.)

[21] Appl. No.: 122,223

[22] Filed: Sep. 15, 1993

Related U.S. Application Data

[63] Continuation-in-part of Ser. No. 800,920, Dec. 3, 1991.

[51] Int. Cl.⁵ .............................................. F01L 1/34
[52] U.S. Cl. .............................. 123/90.16; 123/90.41
[58] Field of Search ............... 123/90.15, 90.16, 90.39, 123/90.41

[56] References Cited

U.S. PATENT DOCUMENTS

| | | | |
|---|---|---|---|
| 4,721,007 | 1/1988 | Entzminger | 123/90.16 |
| 4,986,227 | 1/1991 | Dewey, III | 123/90.16 |
| 5,107,802 | 4/1992 | Yagi et al. | 123/90.15 |
| 5,111,781 | 5/1992 | Kaku et al. | 123/90.16 |
| 5,119,773 | 6/1992 | Schön et al. | 123/90.16 |
| 5,189,997 | 3/1993 | Schneider | 123/90.16 |
| 5,205,247 | 4/1993 | Hoffman | 123/90.16 |

FOREIGN PATENT DOCUMENTS

| | | | |
|---|---|---|---|
| 836367 | 1/1939 | France | 123/90.16 |

Primary Examiner—E. Rollins Cross
Assistant Examiner—Weilun Lo
Attorney, Agent, or Firm—Beaton & Swanson

[57] ABSTRACT

Variable valve lift in an engine is achieved by varying the location of the pivot of the rocker arm or finger follower. The pivot shaft and rocker arm or finger follower have engaging teeth that mate. The pivot shaft rolls across a stationary rack of teeth to change the ratio of valve lift to cam lift, while, for a given position of the pivot shaft, preventing the pivot shaft from rotating. The pivot shaft rides in a bearing block whose movement is constrained by a bearing guide of the same shape as the stationary rack. The shape of the toothed rack on the rocker arm or finger follower is part of a circular cylinder whose radius is determined by the position and angles of the cam and valve. The shape of the stationary rack and bearing guide may vary from that of the rocker arm to allow for altered adjustment clearance with different valve lifts. The relationship between adjustment clearance and pivot shaft position yields controlled variation of phase and duration. At full lift the clearance would be within usual limits, while at partial lift reduced contact velocities allow greater clearance without increasing idle noise, and thus opening of valves may be delayed, and closing advanced.

18 Claims, 8 Drawing Sheets

VARIABLE VALVE LIFT MECHANISM FOR INTERNAL COMBUSTION ENGINE

This application is a continuation-in-part of application Ser. No. 07/800,920 filed Dec. 3, 1991.

FIELD OF THE INVENTION

The present invention relates to an internal combustion engine using poppet type valves to direct gases into and out of one or more cylinders. The degree of lift of the valves, particularly the intake valve, may be altered, along with the opening and closing times of the valves, to optimize engine torque at different engine speeds.

BACKGROUND OF THE INVENTION

The flow dynamics of gases entering and exiting internal combustion engines is one of the controlling factors of engine performance. Most engines must work over a wide speed and load range, making it difficult to achieve optimum efficiency over more than a narrow part of that range. For simplicity, economy and durability, most conventional four stroke engines use the tried-and-true fixed camshaft systems that have constant phase (when the valves are opened), duration (how long the valves are held open) and lift (how far the valves are lifted off their seats). This leads to certain design compromises to achieve acceptable performance. An engine that produces high torque for its capacity at low engine speeds usually gives poor torque at higher engine speeds, and vice versa. In a paper given at the Society of Automotive Engineers Congress in Detroit (Hara, Kumagai and Matsumoto, 1989, SAE paper 890681), the authors present experimental results on an engine in which the timing and lift were varied. Torque was improved by 7% at 1600 rpm by variation of lift, and the improvement at 6000 rpm was 14%. Alteration of lift of the intake valve produced most of the effects seen.

Many approaches have been proposed and tried in attempts to optimize the flow processes. Improvements to the flow dynamics are achieved by three separate but interrelated processes: variable phase, variable duration, and variable lift. It is well known that engines that produce high torque at low speeds have lower overlap between the closing of the exhaust valve and the opening of the intake valve. Small overlap allows for little communication between the exhaust gases and the incoming fresh charge, limiting the amount of uncontrolled mixing. This leads to stable operation. However, at high speeds the inertia of the gases requires a greater period of overlap to allow for gas exchange. The simplest way of achieving the change in overlap is to alter the relative timing, or phasing, of the intake camshaft to the crankshaft and exhaust camshaft.

If the phase of a valve event is altered, say advancing the valve opening to an earlier crankshaft angle, then the closure of that valve is also advanced. In many cases this causes a reduction of the amount of combustible gas that can enter the engine. To overcome this situation, the duration of the valve event may be altered. In the example above, as the engine speed is increased and the valve overlap is increased (opening the intake valve earlier), the period that the intake valve stays open is extended to delay the closing.

The peak lift of valves is designed to accommodate gas flow at maximum engine speeds without significant pressure drops. This is more important for the intake process than the exhaust process, where the piston pushes the gases out. At engine speeds below maximum, the velocity of incoming gases through the valve curtain will produce less turbulence, and may lead to lower torque than would be achieved with a smaller valve opening. By varying valve lift with engine speed, torque may be enhanced over the entire operating range of the engine. Additionally, reduced valve lifts at lower speeds may reduce the frictional losses of the valve train, depending on the design.

There are many examples in the U.S. patent literature of methods of varying either or all of phase, duration and lift. Many authors have recognized that engine performance over a wide speed range may be improved by providing a means of switching between two independent cam profiles for low and high speed operation. Such an "on or off" type controller will provide different values of phase, duration and lift between the two (or possibly more) different engine speed ranges, resulting in improved performance and efficiency for each speed range. However, within each speed range, there is no means of varying phase, duration and/or lift. Examples of such mechanisms are given in U.S. Pat. No. 2,934,052 by Longenecker, U.S. Pat. No. 4,151,817 by Mueller, U.S. Pat. No. 4,205,634 by Tourtelot, U.S. Pat. No. 4,970,997 by Inoue, et al. and U.S. Pat. No. 5,113,813 by Rosa. In SAE paper 890675 (Inoue, Nagahiro, Ajiki and Kishi, 1989) the authors point out that the variable valving system described in U.S. Pat. No. 4,970,997 would have greater mass than conventional systems. Extensive redesign of each component was undertaken to reduce this mass.

Another means of achieving variation in all three parameters is to use an axially moveable camshaft, with a variable profile in the axial direction. In this case there may be a smooth transition between different values of phase, duration and lift, although the relationship between all three is again fixed for a particular axial position of the camshaft. U.S. Pat. No. 3,618,574 by Miller and U.S. Pat. No. 5,080,055 by Komatsu, et al., describe such devices.

An alternative approach to varying all three parameters involves the use of multi-part rocker arms, with one or more of the arms pivoted eccentrically. In U.S. Pat. No. 4,297,270 by Aoyama two interacting rocker arms function to vary phase, duration and lift. In U.S. Pat. No. 4,438,736 by Hara, et al., problems with adjustment clearance and noise in the aforementioned patent are considered to be unacceptable. In this patent, as well as U.S. Pat. No. 4,498,432 by Hara, et al., the problem of clearance and noise is addressed by using an extendible hydraulic cam follower. In all of these cases, the phase, duration and lift of the valves is somewhat inflexible. These systems will probably experience higher levels of friction than conventional systems.

In U.S. Pat. No. 4,714,057 by Wichart, the author discloses control over all three parameters by using a multi-part rocker arm, and a control cam as well as the lift cam. A major purpose of their invention is to be able to control engine load without a throttle plate. Friction may be a problem with this design.

An innovative scheme is disclosed in U.S. Pat. No. 4,898,130 by Parsons, to vary the phase, duration and lift of the valves, with an eccentrically mounted oscillating drive. Besides giving good control over all three parameters, the mechanism disposes of the main valve spring, aiding in lowering friction. The technology is radically different from that employed in current engines, however, and requires the use of a rather long pushrod.

There are several different means disclosed for varying the lift only of valves. In U.S. Pat. No. 5,119,773 by Schon, et al., there is interposed either a slidable or pivoted member between the camshaft and the valve, with a movable pivot providing control for its movement. The mechanisms described appear to have higher friction loads than conventional valve gear, as well as high lateral forces and increased reciprocating mass.

In U.S. Pat. No. 4,187,180 by Buehner and U.S. Pat. No. 4,519,345 by Walter, valve lift only is varied by moving the point of application of the lifting member to the rocker arm. In each case, the mechanism is applied to a pushrod engine, and appears unsuitable for an overhead camshaft geometry. The design does retain conventional valve clearance adjustment.

Movement of the rocker arm pivot is favored in U.S. Pat. No. 4,986,227 by Dewey. In this approach, the rocker arm has an arcuate upper surface upon which rides a movable bearing held by a lever arm, with the lower end of said lever arm being pivoted in the head. Lateral location of the rocker arm is required to ensure the arm remains in contact with both the camshaft and the valve top. This is achieved by a special cap atop the valve, and a suitable recess in the end of the rocker arm. Adjustment of valve clearance differs from conventional valve trains. A similar rocker arm retention scheme is used by Schneider in U.S. Pat. No. 5,189,997, for an overhead cam engine with a finger follower arrangement.

Variable valve lift is achieved by yet another means in U.S. Pat. No. 5,031,584 by Frost. Two fixed pivot rocker arms are combined with a movable interposed member to alter the mechanical advantage of the camshaft to valve movement. The design appears complex, and subject to higher friction losses than conventional designs. Another means of achieving variable valve lift by moving the pivot point is given by Hoffman in U.S. Pat. No. 5,205,247. A rotatable pivot shaft locates a pivot point for a circular rocker arm. The centers of the circular arms of the rocker arm are located on the same side of the rocker arm as the pivot. As the pivot point is varied, the circular shape of the rocker arm offers the same geometry to the cam and valve at each location of the pivot. The valve timing is altered by using different radii and/or offset centers for the arc segments either side of the pivot point, combined with cam profiles that differ from standard profiles.

Entzminger offers a simple concept for varying valve lift in U.S. Pat. No. 4,721,007. A toothed pivot shaft mates with a toothed rack embedded in an elongate rectangular slot in the rocker arm. The pivot shaft translates and rotates simultaneously, following a linear path defined by another stationary toothed rack. This approach has the advantage that the cam end and valve end of the rocker arm resemble a conventional rocker arm. The potential disadvantages of this design are the size of the pivot shaft and the rocker arm, and the flexibility of the rocker arm.

Another class of actuation mechanisms that can vary lift and duration is that of hydraulic actuation, with lost motion. In this method, the cam follower allows enclosed hydraulic fluid to leak out either through a fixed orifice, or through a controlled orifice. For the passive mechanism, the result is that the valve will not open as far or as long at low engine speeds, while at high speeds the leakage is insufficient to significantly alter the valve movement from a conventional system. The active control approach allows lift and duration to be controlled more closely. The result is that conventional throttling may be discarded, as valve motion may be enough alone to control the intake charge. Such a system is described in SAE paper 930820 (Urata, et al., 1993). The drawbacks to the system include non-recovery of the work of opening the valve, variations in motion as the oil changes viscosity with temperature, and complexity. An engine equipped with this system showed significant improvement in torque at lower engine speeds, and when installed in a vehicle, exhibited a fuel economy gain of 7%.

SUMMARY OF THE INVENTION

The present invention is a system for dynamically altering the lift of a poppet valve in an internal combustion engine. This alteration of lift may produce variations in phase and duration if so desired. Variation of lift alone has been shown to increase engine torque throughout the engine operating range. The invention accomplishes variable lift with a moveable pivot for either the rocker arm or the finger follower while meeting other important operating requirements, including:

(1) The design is applicable to pushrod activated, single overhead cam (SOHC) activated and double overhead cam (DOHC) activated valves with either a rocker arm or finger follower.

(2) The design is applicable to a single intake and/or exhaust valve per cylinder, or multiple intake and/or exhaust valves per cylinder.

(3) The rocker arm or finger follower allows for adjustment of valve clearance in the same manner as a conventional rocker arm or finger follower.

(4) The rocker arm or finger follower is located by the pivot mechanism so that neither the cam end nor the valve end differs from conventional design.

(5) Valve clearance can be kept constant regardless of the position of the pivot point. This will alter valve phase and duration. Valve clearance may be varied slightly with pivot shaft position, to achieve altered valve phase and duration, or even to maintain constant phase and duration with varying lift.

(6) The mechanism has a minimum of moving parts, and is compact, requiring no increase in engine height, and allows considerable flexibility in layout of camshaft(s) and valves.

(7) The alteration of lift and/or phase and duration of valve events is accomplished during normal operation of the engine.

(8) The invention is suitable for use in designs wherein the rotation rate of the camshaft is alterable, or an axially varying camshaft is used.

(9) The invention is suitable for use in other designs where the phase and duration of the valve events are alterable by different means.

The degree of valve lift in an engine is controlled by varying the location of the pivot for the rocker arm or finger follower. For a rocker arm pivoted between the camshaft and the valve, or a pushrod and the valve, the upper portion of the central part of the rocker arm contains a rack of teeth that mate with the teeth of a cog fixed on the pivot shaft. The rocker arm rack has a circular cylindrical shape. The pivot shaft does not rotate for a given pivot position, but rolls across a stationary rack to change the effective rocker arm ratio of cam lift to valve lift as Entzminger has described. The pivot shaft is constrained by two or more bearing guides that describe arcs concentric with the stationary rack. The shape of the stationary rack corresponds to either (1) a circle whose radius is constant according to the contact point of the cam (or pushrod) with the rocker, and the contact point of the rocker with the valve, and any intermediate position of the contact point with the pivot shaft and the toothed rack, resulting in constant adjustment clearance (achieved in the same manner as conventional valve gear) and variable phase and duration of the valve events, or (2) the same circular path as (1), but with the center of the circle offset from that for the rocker arm toothed rack, to allow varying adjustment clearance as the pivot point is moved, or (3) a non-circular path allowing for non-uniform adjustment clearance, with the aim of varying phase and duration differently from (1). Further, as the teeth on the rocker arm roll over the teeth on the pivot shaft rather than slide, frictional losses are very low.

For a finger follower operating a valve where both the cam and valve are on the same side of the pivot, the primary concept of the design is similar to that given above. The pivot end of the finger follower consists of a toothed rack which engages the complementary teeth of a cog fixed on the pivot shaft. As above, the pivot point changes by the pivot shaft rolling to a new position on the stationary rack by a path defined by two or more suitable bearing guides. The shape of the stationary rack and pivot shaft bearing guide are similar to those described above, depending on the geometry of the valve, cam and pivot. As indicated above, movement of the pivot shaft may or may not alter the valve clearance adjustment.

DETAILED DESCRIPTION OF THE INVENTION

Figure 1:
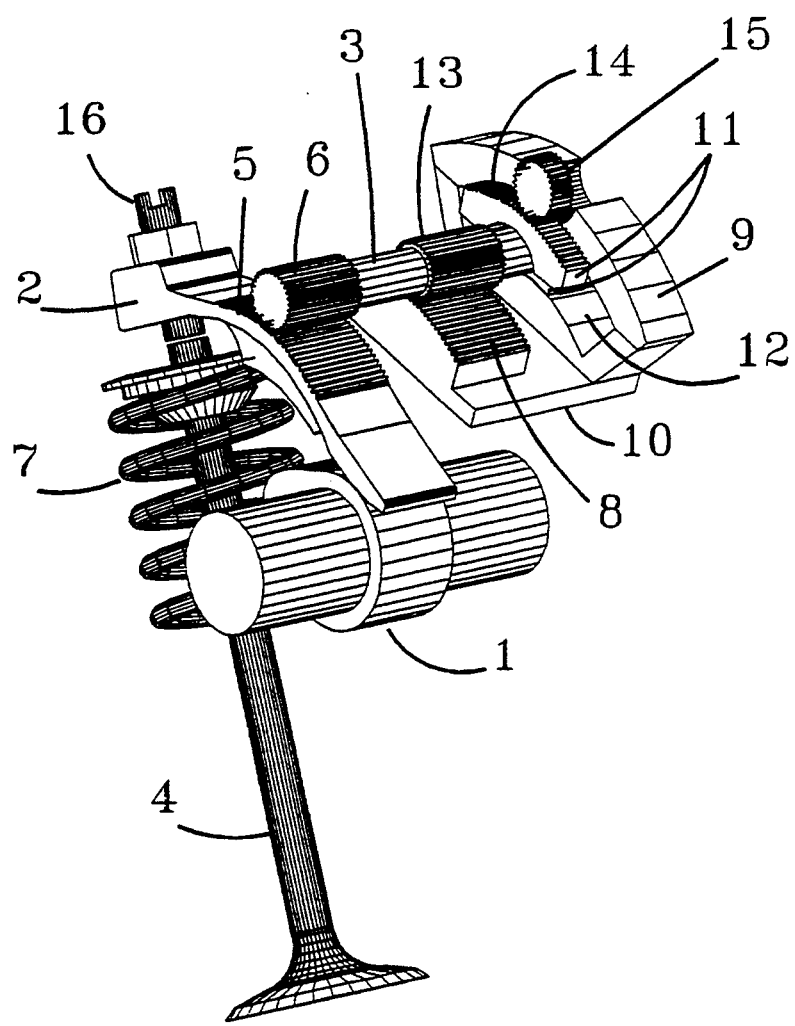
FIG. 1 is a perspective view of an embodiment of the rocker arm mechanism with the invention as applied to an overhead camshaft engine. The toothed rack atop the rocker arm is shown, with the toothed pivot shaft, the stationary rack, the cam, the valve adjuster, the valve stem, one guide block and bearing block (with at least one other being required but not shown), and a means for moving the bearing block.

In FIG. 1, cam 1 rocks rocker arm 2 against pivot shaft 3 to open valve 4. When cam 1 has its base circle presented to rocker arm 2, toothed rack 5 on the upper surface of said rocker arm it held in mesh with the teeth of toothed pivot cog 6 on pivot shaft 3 by a light spring (not shown). When cam 1 lifts its end of rocker arm 2 to rock the rocker arm 2, the resistive force of the valve spring 7 associated with valve 4 ensures contact between the toothed rack 5 and the toothed pivot cog 6. Stationary rack 8 has the same tooth pattern as toothed rack 5 on the upper surface of rocker arm 2. When pivot shaft 3 is located at one particular position, it is prevented from rotating by stationary rack 8.

To achieve different lift, pivot shaft 3 is rolled across stationary rack 8 to the new desired position. Again, at that new position, stationary rack 8 prevents pivot shaft 3 from rotating. Stationary rack 8 and bearing guide 9 are fixed on base 10, and pivot shaft 3 is rotatably mounted in bearing block 11. One embodiment of the control path for pivot shaft 3 is shown where bearing block 11 slides in bearing surfaces 12 of bearing guide 9. Bearing guide 9 may be adjusted for height using shims, to align stationary rack 8 and bearing surfaces 12. Alternatively, the lower bearing surface 12 may be replaced by stationary rack 8. Pivot shaft 3 is allowed to rotate in bearing guide 9 while toothed cog 13 is held in contact with stationary rack 8, ensuring that translation and rotation of pivot shaft 3 occur simultaneously. Affixed to bearing block 11 is toothed drive rack 14, acted upon by actuator 15, to slide bearing block 11 back and forth as desired in bearing guide 9. (See FIG. 3 for more details.) It can be seen clearly in FIG. 1 that the cam end and the valve adjustment end of the rocker arm are identical in form and function to those used on existing conventional rocker arms on many engines.

Figure 2A:
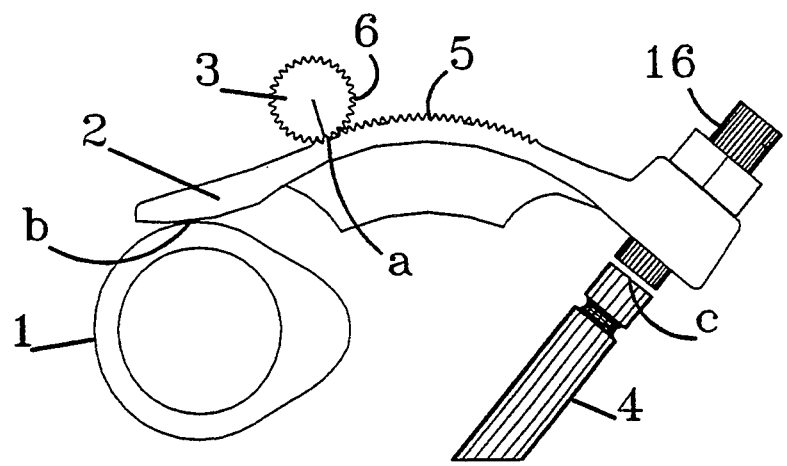
FIG. 2(a) shows a side elevational view of the cam, rocker, arm, pivot shaft and valve, with the pivot shaft in the maximum valve lift position.

In FIG. 2(a), the pivot shaft 3 has been rolled to the position of maximum lift of the valve 4. The rocker arm ratio is given by the distance between points a and b (denoted a-b) and the distance between points a and c (denoted a-c). Thus the amplification of the cam lift is (a-c)/(a-b).

Typically this value may be in the range 1.2 to 1.8. As the rocker arm 2 pivots on toothed cog 6, point a will move slightly. The radius of toothed cog 6 should be small enough relative to the curvature of tooth rack 5 that the distances a-b and a-c do not change significantly during actuation by cam 1.

Figure 2B:
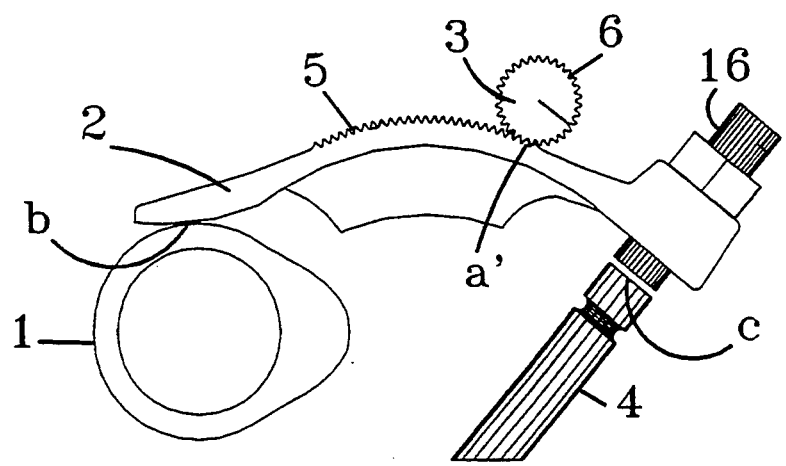
FIG. 2(b) shows a side elevational view of the cam, rocker arm, pivot shaft and valve, with the pivot shaft in the minimum valve lift position.

In FIG. 2(b) the pivot shaft 3 has been rolled to the position of minimum lift of valve 4. The rocker arm ratio is now given by (a'-c)/(a'-b), and will be less than that for the geometry in FIG. 2(a). The section of circular arc defining toothed rack 5 on the upper surface of rocker arm 2 is determined by the contact point of the cam 1 and the rocker arm 2, and the adjuster 16 and the top of the valve stem 4.

The references in the claims herein to "rolling" of the pivot shaft 3 on the stationary rack 8 or rocker arm rack 2 refer to this action described above in which the pivot shaft is engaged with the rack so that when it shifts in pivot position it simultaneously rolls. The rolling is required, since the pivot shaft 3 is engaged with the racks by their respective teeth. Moreover, this rolling is desirable, because it ensures that there is no slipping between the pivot shaft 3 and either the rocker arm 2 or stationary rack 8. Most important, there can be no movement of the rocker arm 2 in a direction parallel to its length which could cause interference with the head or could impair the actuation of the valve as the rocker arm 2 rocks on the pivot shaft 3. It can be appreciated that other mechanisms may be apparent to one skilled in the art which are equivalent to this system of a toothed pivot shaft and mating racks, such as a friction system or gear engagement or anything else that prevents slippage between the pivot shaft 3 and the rocker arm 2 and stationary rack 8.

Figure 3:
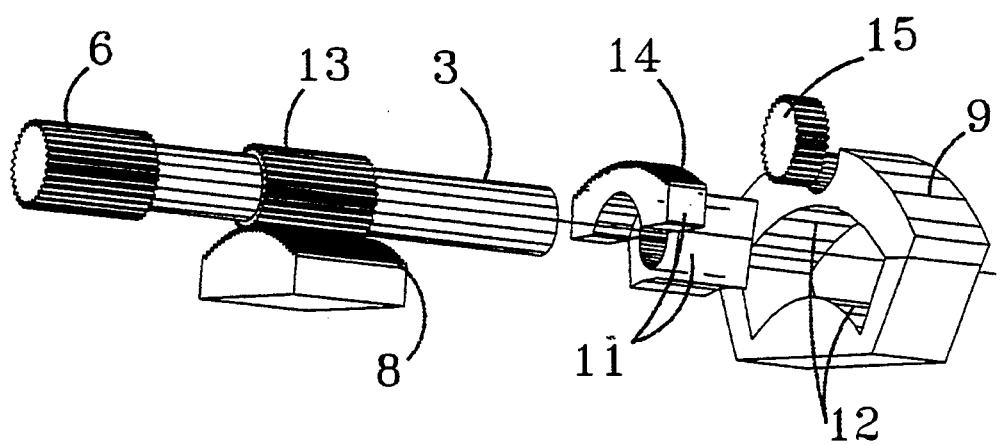
FIG. 3 shows an exploded perspective view of one embodiment for constraining the movement of the pivot shaft.

FIG. 3 shows one embodiment of a bearing block 11 sliding between two bearing surfaces 12 of bearing guide 9, with the components separated axially for clarity. The two bearing surfaces 12 define the path taken by pivot shaft 3, and are concentric with the shape of stationary rack 8. Bearing block 11 allows pivot shaft 3 to rotate freely. Adjustable toothed rack 14 is part of bearing block 11, and allows bearing block 11 to be moved along bearing surfaces 12 when acted upon by reversible actuator 15. Said reversible actuator may be rotated by any suitable means responsive to engine speed such as a motor or other mechanical or electromechanical system. Reversible actuator 15 is held fixed in relation to bearing guide 9, and in the embodiment shown, its axis of rotation is parallel to pivot shaft 3. Toothed rack 14 may have suitable stops to act against position switches mounted either on actuator 15 or bearing guide 9 to stop the bearing block 11 against the bearing guide 9. As reversible actuator 15 rotates, guide block 11 slides between bearing surfaces 12, while pivot shaft 3 rotates due to the meshed teeth of stationary rack 8 and complementary toothed cog 13. Thus pivot shaft 3 rotates while its path of translation follows the contour of bearing surfaces 12. This movement causes the pivot point between toothed rack 5 on the upper surface of rocker arm 2 and toothed cog 8 to move as desired. The translation mechanism embodied in toothed drive rack 14 and reversible actuator 15 may be replaced with a suitable hydraulic means to force bearing block 11 back and forth along bearing surfaces 12.

Figure 4:
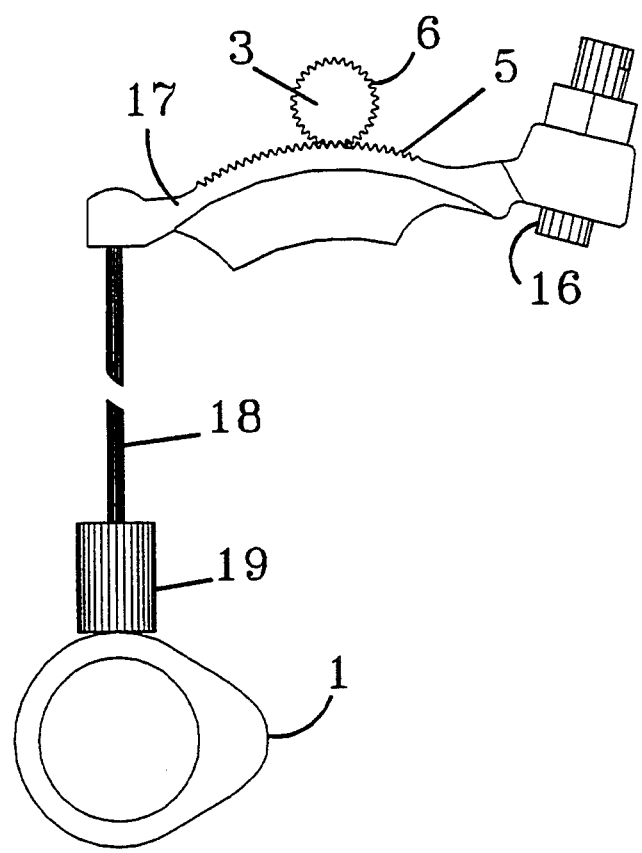
FIG. 4 shows a side elevational view of the same mechanism as for FIG. 1, but adapted to a pushrod activated rocker arm.

FIG. 4 shows an elevational view of the mechanism as applied to a pushrod activated valve. The operation is essentially identical to that described above, with the camshaft now interacting with the rocker arm 17 via a pushrod 18 and cam follower 19.

Figure 5A:
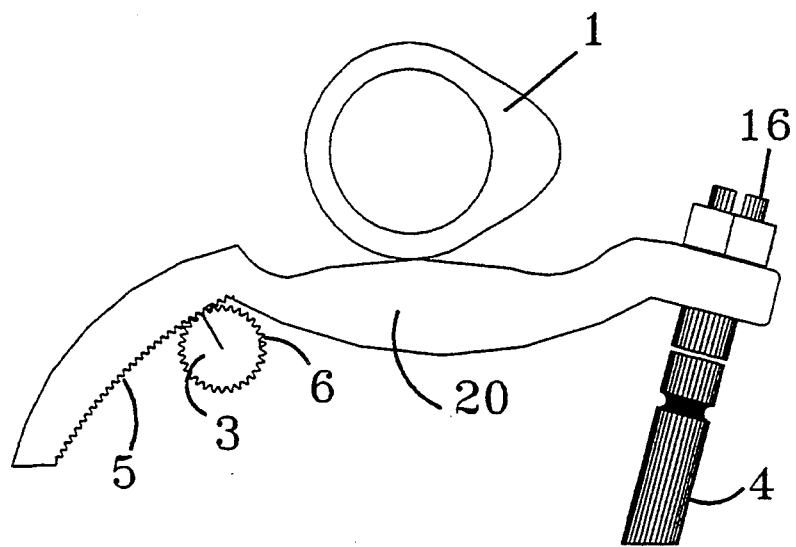
FIG. 5(a) shows a side elevational view of the pivot shaft, cam and valve for a finger follower geometry overhead cam arrangement, with the pivot shaft in the maximum valve lift position.
Figure 5B:
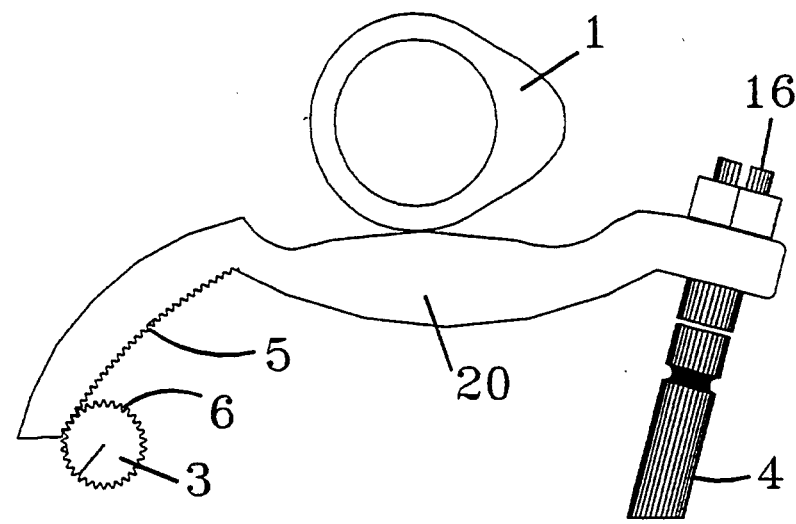
FIG. 5(b) shows a side elevational view of the cam, finger follower and pivot shaft, with the pivot shaft in the minimum valve lift position.

An overhead cam arrangement whereby the valve is acted upon by a finger follower is illustrated in FIG. 5(a). In this geometry, the cam and valve are on the same side of the pivot point, not opposite as for the rocker arm. The force acting on pivot shaft 3 is now in the opposite direction from that for the rocker arm, and toothed rack 5 is now on the underside of follower 20. The range of rocker arm ratios is much more limited for the finger follower geometry than for the rocker arm. The smallest rocker arm ratio is one, with an infinitely long follower. Consequently, this geometry will not yield as much control over valve phase and duration as the rocker arm geometry. In FIG. 5(a) pivot shaft 3 is at its innermost position, resulting in the maximum lift for valve 4. In FIG. 5(b), the pivot shaft has been moved to its outermost position, giving the minimum lift for valve 4. A suitable guiding arrangement and actuation mechanism with a stationary rack, similar to that shown in FIG. 3 for the rocker arm geometry may be used to control the movement of pivot shaft 3 for this geometry.

Figure 6:
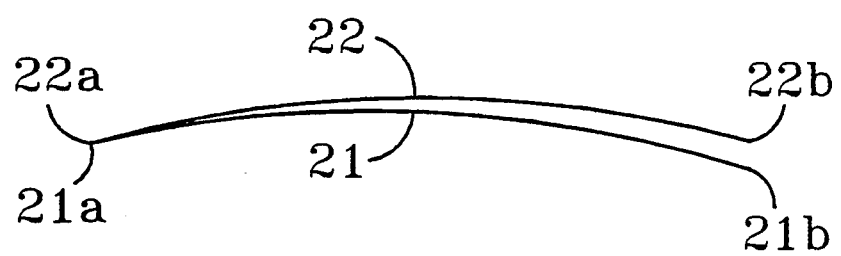
FIG. 6 shows a plot of how valve clearance may be altered dynamically, by offsetting the centers of the circles describing the toothed rack on the rocker arm or finger follower, and the stationary rack and bearing guide.

FIG. 6 shows how valve clearance might be controlled while maintaining a circular shape to stationary rack 8 and bearing surfaces 12. It is desirable that such a shape be circular if bearing block 11 has concentric upper and lower surfaces to slide on bearing surfaces 12. If bearing block 11 has needle roller bearings or other similar line contacts between itself and bearing surfaces 12, slightly non-circular paths might be acceptable. In FIG. 6, the pivot shaft contact point 21a for maximum valve lift lies on arc 21 of a circle describing the path of movement of pivot shaft 3, as defined by stationary rack 8 and concentric with bearing surfaces 12. Circular arc 22 shows the path of rack 5 on rocker arm 2 when pivot shaft 3 is in the position of maximum lift. In this example, circular arcs 21 and 22 coincide at points 21a and 22a. As pivot shaft 3 is moved to the position of minimum valve lift, shown as point 21b on circular arc 21, point 22b on circular arc 22 for the rocker arm will thus be forced to converge to position 21b on circular arc 21. The difference in height between positions 21b and 22b is the amount that the adjustment clearance would be reduced. Typically the reduction in clearance desired would be quite small compared to the radii of circles 21 and 22, making the alteration of clearance with pivot shaft contact position close to linear.

Figure 7A:
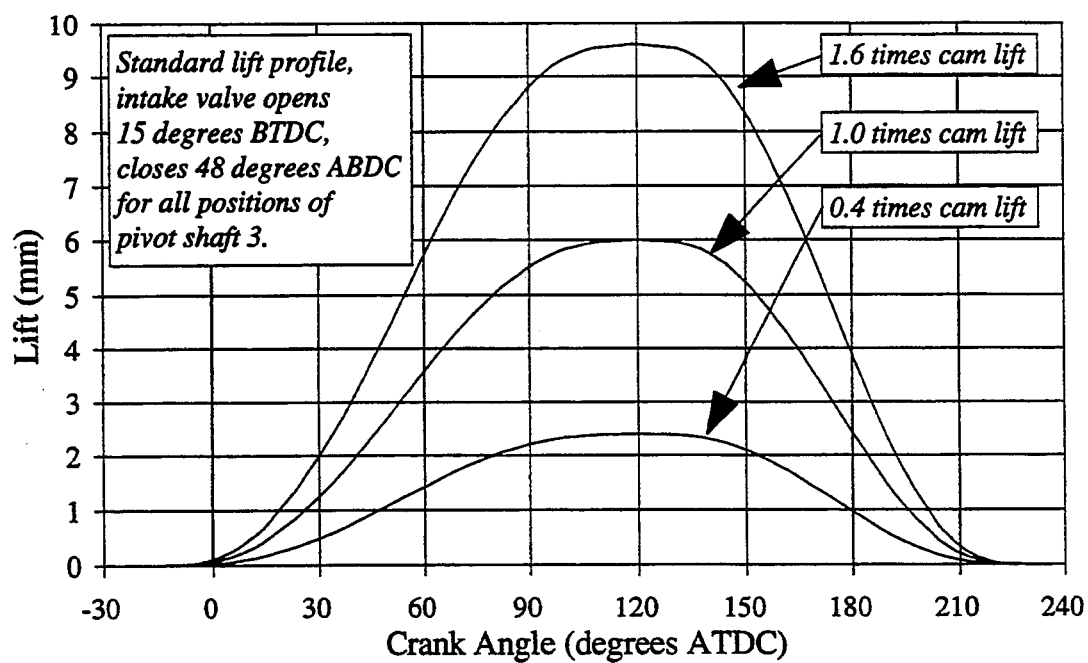
FIG. 7(a) shows a plot of valve lift versus crankshaft angle for an intake valve operated by a rocker arm, at different rocker arm ratios.

FIG. 7(a) shows three curves of lift versus crankshaft angle. The curves are for an intake valve, with the valve opening at 15 degrees before top dead center (BTDC), and closing at 48 degrees after bottom dead center (ABDC). The upper curve demonstrates essentially standard valve lift, for a rocker arm ratio of 1.6:1. The central curve is the cam lift, or simply a rocker arm ratio of 1:1, where the lift is shown as 0.625 times that of the standard lift. The bottom curve shows the lift resulting from a rocker arm ratio of 0.4:1, or one quarter that of the standard lift. Again, the lift shown here is just the standard lift multiplied by one quarter. Of interest here is the relationship between adjustment clearance and the opening and closing angles of the valve. In reality, as the valve lift is altered, unless the adjustment clearance is altered proportionally, the timing of valve opening and closing will vary. In this case, where the lift is reduced from 1.6 times the cam lift to 0.4 times the cam lift, then the clearance is reduced by the same amount, a factor of four. This implies that the path described by bearing surfaces 12 ensures that the contact point of pivot shaft 3 with toothed rack 5 reduces valve adjustment clearance as lift is reduced from maximum to minimum. Refer to FIG. 6, and the explanation above.

The situation of a circular cylindrical path for bearing surfaces 12 and stationary rack 8 provides a good example to aid in understanding how the clearance affects valve timing. Typically, such a valve setup might have a clearance of 0.15 mm for an intake valve, with a standard rocker arm ratio of 1.6:1. This means that the take-up ramp on the cam is 0.094 mm, before the real lift of the cam commences. When the rocker arm ratio is reduced to 0.4:1 with the same clearance, the take-up ramp will only absorb 0.038 mm of the clearance, and the remaining 0.112 mm will require approximately 25 degrees of crankshaft rotation to take up, delaying the opening and advancing the closing of the valve. Reduced lift, and therefore later valve opening and earlier valve closing, occur at lower engine speeds. Consequently, valve actuation beyond the take-up ramp, especially valve acceleration, should not be problematic as it would at higher engine speeds, provided such variations in timing are kept within practical limitations. The consequence of this is that the adjustment clearance may be altered with the position of pivot shaft 3 to produce the desired degree of alteration of valve phase and duration with lift.

Figure 7B:
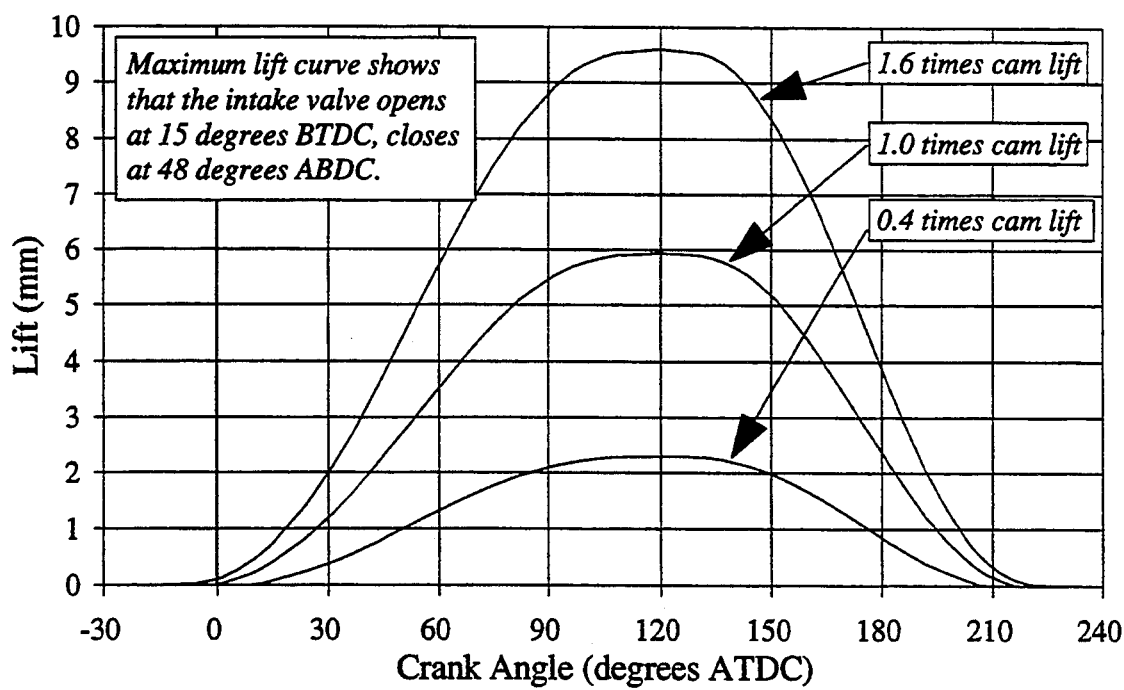
FIG. 7(b) shows a plot of valve lift versus crankshaft angle for an intake valve operated by a rocker arm, at different rocker arm ratios, with constant valve clearance.

FIG. 7(b) shows the effect of constant adjustment clearance on valve phase and duration. By reducing the lift ratio from 1.6:1 to 1.0:1, valve opening occurs 14 degrees later (and consequently valve closing occurs 14 degrees earlier, for a symmetric cam profile.) Reducing the lift ratio further, from 1.6:1 to 0.4:1, the change in timing is 25 degrees for each event, with the change in valve duration decreased by 50 degrees from the standard profile. Asymmetric cam profiles might be used if the changes in opening and closing angles are required to be different.

A finger follower geometry might yield similar ratios to the top two curves in FIG. 7(b), allowing alteration of valve events by 14 degrees or more, and duration by 28 degrees or more.

One consequence of this design is that a higher lift cam may be used than in conventional compromise designs, with the incorporation of earlier opening and later closing of the either or both intake and exhaust valves. The alteration of phase and duration would still allow docile engine characteristics at low engine speeds. Thus the invention allows for considerable flexibility in lift and timing of valve events.

What is claimed is:

1. An apparatus for varying the extent of opening of an internal combustion engine valve responsive to a cam on a camshaft, comprising: a rocker arm having a body with a rack of teeth, a cam follower in contact with said cam, and an actuator to open said valve; and a pivot shaft having a set of rocker arm-engaging teeth mating with the rocker arm body rack of teeth whereby the rocker arm rocks on said pivot shaft to open and close the valve as the cam follower is moved by the cam, the position of the pivot shaft being adjustable as the pivot shaft set of rocker arm-engaging teeth are engaged with the rocker arm body rack of teeth to adjust the rocking of the rocker arm body and thereby adjust the extent of opening of the valve; wherein there is a valve clearance space between the valve and the actuator which is varied by the rolling of the pivot shaft, and wherein the opening and closing of the valve are timed by the rocking of the rocker arm, the opening and closing of the valve being timed at a first timing when the pivot shaft is at a first position on the rocker arm and being timed at a second timing different from the first timing when the pivot shaft is at a second position on the rocker arm different from the first position.

2. A method for operating and varying the extent of opening of an internal combustion engine valve responsive to a cam on a camshaft, comprising: adjustably rolling a pivot shaft with a set of teeth on a rocker arm which rocks on the pivot shaft in order to vary the rocking of the rocker arm on the pivot shaft and thereby vary the extent of opening of the valve, the rocker arm having a body with a rack of teeth engaging said pivot shaft teeth, a cam follower in contact with said cam, and an actuator to actuate the valve, wherein the pivot shaft position on the rocker arm body is adjustable to vary the extent of opening of the valve caused by the actuator; and opening and closing said valve by rocking the rocker arm on the pivot shaft; wherein there is a valve clearance space between the valve and the actuator and wherein the step of rolling said pivot shaft on said rocker arm includes adjusting the valve clearance space; wherein the opening and closing of the valve are timed by the rocking of the rocker arm, and when the pivot shaft is rolled to a first position the timing the of the valve opening is advanced, the extent of the valve opening is increased, and the timing of the valve closing is delayed, relative to when the pivot shaft is rolled to a second position different from the first position.

3. The method of claim 2, wherein said engine speed when said pivot shaft is at said first position is increased relative to when said pivot shaft is at said second position.

4. An apparatus for varying the extent of opening of an internal combustion engine valve responsive to a cam on a camshaft, comprising: a rocker arm having a body with a rack of teeth, a cam follower in contact with said cam, and an actuator to open said valve; a pivot shaft having a set of rocker arm-engaging teeth mating with the rocker arm body rack of teeth whereby the rocker arm rocks on said pivot shaft to open and close the valve as the cam follower is moved by the cam; a stationary rack of teeth and wherein the pivot shaft includes a set of teeth to engage the stationary rack, the pivot shaft being rollable along the stationary rack of teeth; a pivot shaft guide to which the pivot shaft is rotatably attached, the position of the pivot shaft guide being adjustable to adjustably roll the pivot shaft; wherein the pivot shaft guide includes a guide mount and a block engaged with the pivot arm and slidably mounted on the mount whereby the sliding of the block on the mount rolls the pivot shaft; the position of the pivot shaft being adjustable as the pivot shaft set of rocker arm-engaging teeth are engaged with the rocker arm body rack of teeth to adjust the rocking of the rocker arm body and thereby adjust the extent of opening of the valve.

5. The apparatus of claim 4, wherein the block includes a block rack and further comprising a rotatable toothed block shaft engaged with the block rack whereby the rotation of the block shaft effects a sliding of the block through the mount.

6. The apparatus of claim 4, wherein there is a valve clearance space between the valve and the actuator, which is substantially constant regardless of the rolling of the pivot shaft, and wherein the opening and closing of the valve are timed by the rocking of the rocker arm.

7. The apparatus of claim 6, wherein when the pivot arm is rolled to a first position, the timing of the valve opening is advanced, the extent of valve opening is increased, and the timing of the valve closing is delayed, relative to when the pivot shaft is rolled to a second position different from the first position.

8. The apparatus of claim 7, wherein the pivot shaft is rolled to said first position when the engine is at a first speed and the pivot shaft is rolled to said second position when the engine is at a second speed slower than the first speed.

9. The apparatus of claim 6, wherein the rocker arm rack of teeth define a circular arc and the pivot shaft rolls in a pivot shaft circular arc substantially concentric with the rocker arm rack of teeth circular arc.

10. The apparatus of claim 4, wherein there is a valve clearance space between the valve and the actuator which is varied by the rolling of the pivot shaft, and wherein the opening and closing of the valve are timed by the rocking of the rocker arm.

11. The apparatus of claim 10, wherein when the pivot arm is rolled to a first position, the timing of the valve opening is not significantly advanced and the timing of the valve closing is not significantly delayed, relative to when the pivot shaft is rolled to a second position different from the first position.

12. The apparatus of claim 11, wherein the rocker arm rack of teeth do not define a circular arc concentric with a circular arc defined by the rolling of the pivot shaft.

13. The apparatus of claim 12, wherein the pivot shaft rolls in a pivot shaft circular arc and the rocker arm rack of teeth define a circular arc, but the pivot shaft circular arc and rocker arm rack of teeth circular arc are non-concentric.

14. A method for operating and varying the extent of opening of an internal combustion engine valve responsive to a cam on a camshaft, comprising: adjustably rolling a pivot shaft with a set of teeth on a rocker arm which rocks on the pivot shaft in order to vary the rocking of the rocker arm on the pivot shaft and thereby vary the extent of opening of the valve, the rocker arm having a body with a rack of teeth engaging said pivot shaft teeth, a cam follower in contact with said cam, and an actuator to actuate the valve, wherein the pivot shaft position on the rocker arm body is adjustable to vary the extent of opening of the valve caused by the actuator, wherein the pivot shaft includes a set of teeth to engage a stationary rack of teeth, and said step of rolling the pivot shaft includes rolling the pivot shaft along the stationary rack of teeth, and wherein the pivot shaft is rotatably engaged with a pivot shaft guide and wherein said step of rolling said pivot shaft is by moving the pivot shaft guide; and opening and closing said valve by rocking the rocker arm on the pivot shaft; and wherein the pivot shaft guide includes a block slidably mounted in a mount, the block being engaged with a block driver to slide the block through the mount.

15. The method of claim 14, wherein the block includes a rack of block teeth and the block driver is a rotatable toothed shaft engaged with the rack of block teeth and said step of rolling the pivot shaft is by rotating the rotatable toothed shaft.

16. The method of claim 14, wherein there is a valve clearance space between the valve and the actuator and wherein the step of rolling said pivot shaft on said rocker arm includes adjusting the valve clearance space.

17. The method of claim 14, wherein the opening and closing of the valve are timed by the rocking of the rocker arm, and when the pivot shaft is rolled to a first position the timing of the valve opening is advanced, the extent of the valve opening is increased, and the timing of the valve closing is delayed, relative to when the pivot shaft is rolled to a second position different from the first position.

18. The method of claim 17, wherein said engine speed when said pivot shaft is at said first position is increased relative to when said pivot shaft is at said second position.

* * * * *